United States Patent

[11] 3,542,395

| [72] | Inventor | Benson U. Millikan<br>1651 S. Holloday Ave., Seaside, Oregon 97138 |
|---|---|---|
| [21] | Appl. No. | 759,610 |
| [22] | Filed | Sept. 13, 1968 |
| [45] | Patented | Nov. 24, 1970 |

[54] TRAILER HITCH
9 Claims, 4 Drawing Figs.

[52] U.S. Cl. ................................................. 280/406, 280/446
[51] Int. Cl. ..................................................... B62d 53/00
[50] Field of Search ........................................... 280/406, 461, 446(.3)

[56] References Cited
UNITED STATES PATENTS

| 2,738,206 | 3/1956 | Loughner ................. | 280/461 |
| 2,789,834 | 4/1957 | Chism ...................... | 280/406(.1) |
| 2,808,272 | 10/1957 | Reese ....................... | 280/406(.1) |
| 3,129,957 | 4/1964 | Bernard et al. ............ | 280/406(.1) |
| 3,194,584 | 7/1965 | Reese ....................... | 280/406(.1) |
| 3,284,098 | 11/1966 | Worley ..................... | 280/406(.1) |
| 3,400,948 | 9/1968 | Matson ..................... | 280/406(.1) |
| 3,403,928 | 10/1968 | Laughlin .................. | 280/406(.1) |

Primary Examiner—Leo Friaglia
Attorney—Buckhorn, Blore, Klarquist and Sparkman

ABSTRACT: A trailer hitch including stabilizer arms for transferring a part of the load of a trailer to the front wheels of the towing vehicle is provided with vertically disposed hydraulic cylinder and piston means located at either side of the trailer tongue for controllably upraising the stabilizer arms. The hydraulic cylinder and piston means are hydraulically coupled and under the control of a common pump.

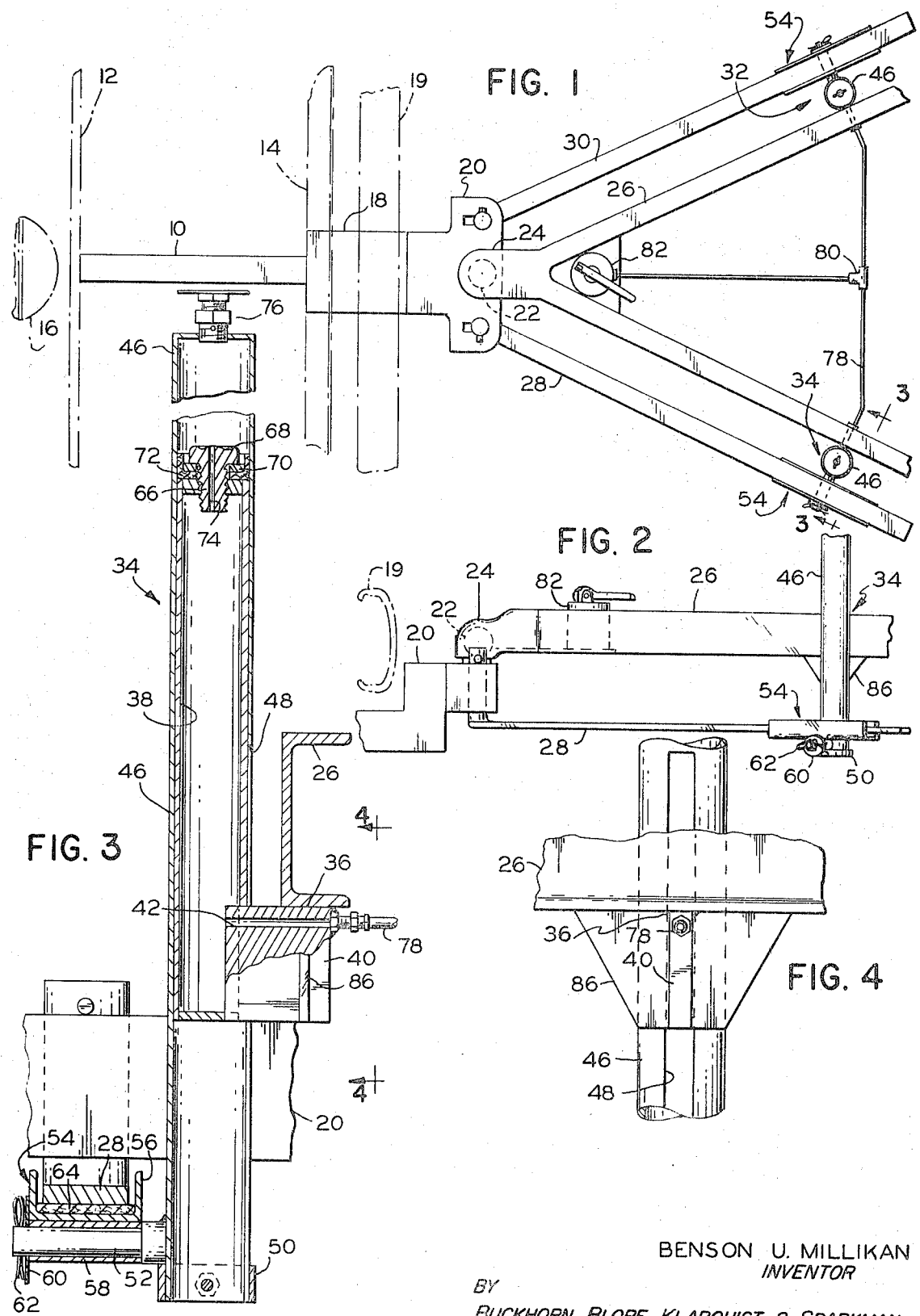

TRAILER HITCH

BACKGROUND OF THE INVENTION

An advantageous form of trailer hitch includes a pair of balanced stabilizer arms extending rearwardly from either side of the hitch ball on a towing vehicle. These stabilizer arms are mounted for rotation in a horizontal plane, and means comprising a chain, strap, or the like, connects the stabilizer arms with the tongue of the towed vehicle or trailer, which, of course is also provided with a socket for engaging the aforementioned ball. The chain, strap, or the like, in effect upraises the stabilizer arms with respect to the trailer tongue, and in so doing, transfers a portion of the load of the trailer from the rear wheels of the towing vehicle to the front wheels of the towing vehicle thereby preventing undesired depression of the rear of the towing vehicle by the trailer's weight. Initially, the trailer tongue is supported on a jack at the proper elevation with its socket in connection with the trailer hitch ball. Then the chains or straps between the trailer tongue and the stabilizer arms are secured in place before the aforementioned jack is removed. Unfortunately, the chains or straps conventionally employed provide a limited mount of adjustment in positioning of the trailer tongue with respect to the stabilizer arms. A chain has a limited number of links with which connection may be made, or the usual strap arrangement has a limited number of bolt holes which must be changed for adjustment. Moreover, the arrangement requires the aforementioned jack support of the trailer tongue, or some other support, in order to make the required adjustments.

SUMMARY OF THE INVENTION

According to the present invention, a pair of hydraulic cylinder and piston means are supported on the sides of a trailer tongue, which in turn adjustably support trailer hitch stabilizer arms for upraising the same. The hydraulic cylinder and piston means are connected in the same hydraulic circuit, and are operated by the same pump, which is used for upraising the stabilizer arms and therefore for upraising the connection between the trailer and the towing vehicle. Not only can any desired adjustment be made, but also no external support is required when making such adjustment. The trailer hitch including the stabilizer arrangement allows the trailer and towing vehicle to be easily detachable. Moreover, since the hydraulic cylinder and piston means are connected in the same hydraulic circuit, the load on the two stabilizer arms is self-adjusting, as when the towing vehicle has a slightly tilted orientation with respect to the trailer.

The lower portion of the hydraulic cylinder and piston means is desirably provided with a friction shoe for slidably engaging the hitch stabilizer arms. Then, when the towing vehicle turns a corner, the stabilizer arms are allowed to slide with respect to the trailer tongue. Thus not only is the vertical position of the rear of the towing vehicle adjustable hydraulically, but also the friction between the aforementioned friction shoes and the stabilizer arms is hydraulically adjustable. This friction is desirably optimized to cause minimum sway of the trailer with respect to the towing vehicle.

It is accordingly an object of the present invention to provide an improved trailer hitch which permits easy attachment of a trailer to a towing vehicle.

It is a further object of the present invention to provide an improved trailer hitch having improved stabilizing features for shifting part of the load to the forward wheels of the towing vehicle, wherein the degree of such transfer, and therefore the vertical position of the rear of the towing vehicle, is adjustable to any desired degree.

It is a further object of the present invention to provide an improved trailer hitch adapted for adjustably lessening side sway between a trailer and a towing vehicle.

It is a further object of the present invention to provide an improved trailer hitch having advantageous stabilizing features permitting a certain amount of twisting or skewing of the towing vehicle with respect to the trailer.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a plan view of a trailer hitch in accordance with the present invention;

FIG. 2 is a side view of the FIG. 1 trailer hitch;

FIG. 3 is a cross-sectional view of the trailer hitch taken at 3–3 in FIG. 1, particularly illustrating hydraulic cylinder and piston means employed according to the present invention; and FIG. 4 is an elevational view of a portion of such hydraulic cylinder and piston means taken at 4–4 in FIG. 3.

DETAILED DESCRIPTION

Referring to FIGS. 1 and 2, the trailer hitch comprises a usual draw bar 10 secured between cross frame members or cross braces 12 and 14 which are either present on the underside of a towing vehicle such as an automobile, or which may be added to the vehicle frame for purpose of supporting the hitch. The draw bar is located generally rearwardly of the towing vehicle differential 16 and supports at its rearward extremity a draw bar sleeve 18 which extends under the vehicle rear bumper 19. Slidably secured in draw bar sleeve 18 is a hitch head 20 centrally provided with an upraised ball 22 which receives the socket 24 at the forward end of a V-shaped trailer frame tongue 26. At either side of ball 22, stabilizer arms 28 and 30 are journaled for horizontal rotation with respect to a hitch head 20. These stabilizer arms are formed of substantially stiff or spring steel material and are adapted to rotate in a horizontal plane while resisting vertical movement thereof. These stabilizer arms are conventionally secured in some manner to each side of trailer tongue 26, and, should the rear of the towing vehicle tend to drop due to the weight of the trailer and connection therewith, tongue 26 and the stabilizer arms upraises the tongue of the towed vehicle and in effect transfers part of the load to the forward end of the towing vehicle.

According to the present invention, rather than providing a chain or strap connection between tongue 26 and stabilizer arms 28 and 30, advantageous hydraulic cylinder and piston means 32 and 34 are supported at each side of the V-shaped trailer tongue, e.g. at the outside of the respective legs of the trailer tongue. As illustrated in FIG. 3, the trailer tongue 26 may comprise a channel to which the hydraulic cylinder and piston means is joined as by welding at 36. A gusset plate 86 further secures hydraulic cylinder and piston means to the tongue 26.

Further referring to FIG. 3 illustrating a preferred embodiment of the hydraulic cylinder and piston means according to the present invention, an internal piston or internal plunger 38 is internally hollow and is secured and supported at its lower extremity by a right-angle extension 40 welded to tongue 26 at 36. Extension 40 is provided with an internal hydraulic connection 42 communicating with the interior of the plunger or piston 38 at one end, while communicating with hydraulic line 78 at its outer end. Hydraulic cylinder 46, is vertically slidably upon piston or plunger 38 and is provided with a slot 48 through which extension 40 passes. As thus appears, the cylinder may be slidably upraised with respect to plunger or piston 38.

Cylinder 46 is provided with a collar 50 at its lower extremity, and above this collar a horizontal pin 52 is joined to the cylinder for journaling friction shoe 54 for rotation in a vertical plane about horizontal pin 52. The friction shoe suitably includes a channel member 56 welded to sleeve 58 at its lower side, the sleeve being received upon pin 52. A washer 60 received over the end of the pin together with cotter key 62 retains the friction shoe upon horizontal pin 52. Channel member 56 is desirably provided with a friction pad 64 formed from brake lining material or the like bonded to the bottom inner surface of channel member 56. Friction pad 64 is adapted to slidably support stabilizer arm 28 when the cylinder 46 is upraised to the position shown in FIG. 3.

The upper portion of plunger or piston 38 is tapped to receive threaded coupling 66 having enlarged head 68 which secures washer 70 on the top of leather cup 72 contacting the inner walls of cylinder 46. The threaded coupling 66 has a longitudinal passage 74 for communicating hydraulic fluid from the interior of plunger or piston 38 to the interior of cylinder 46 above plunger or piston 38. Thus, when hydraulic fluid is forced into the interior of piston 38 through line 78, hydraulic fluid passes into the top of cylinder 46 forcing the cylinder upward and thereby bringing friction shoe 54 into upraising contact with stabilizer arm 28. Vent valve 76 is employed to purge air from the hydraulic system.

The hydraulic cylinder and piston means 32 and 34 are desirably interconnected via a common hydraulic line 78 extending between the two pistons. A T-connection 80 in this line connects the pistons to a pump and source of hydraulic fluid 82. The pump includes conventional check valve and release valve means.

For connecting a trailer to a towing vehicle by means according to the present invention, trailer socket 24 is placed upon ball 22. At this time a hydraulic valve in pump 82 is open so as to return hydraulic fluid to its source whereby friction shoes 54 are in their lowermost position underneath the level of stabilizer arms 28 and 30. At the same time stabilizer arms 28 and 30 are suitably swung out of the way toward bumper 19 of the towing vehicle. When the weight of the vehicle is placed upon ball 22, the rear end of the towing vehicle may become depressed. Now stabilizer arms 28 and 30 are swung into alinement with friction shoes 54, and pump 82 is operated whereby cylinders 46 are raised carrying with them friction shoes 54. As friction shoes 54 engage the underside of stabilizer arms 28 and 30, the pump 82 is further operated, the rear end of the towing vehicle will be upraised to a level position. The degree of leveling can be adjusted to a just-desired amount. It will be observed that the leveling is accomplished without the necessity of additional means jacking up trailer tongue 26, and any readjustment can be made without placing a jack or similar device underneath the trailer tongue.

A common hydraulic connection for coupling between the pistons in hydraulic cylinder and pistons means 32 and 34 allows the hydraulic cylinder and piston means to exchange fluid whereby stabilizing is maintained with the towing vehicle even though the towing vehicle may be somewhat twisted or skewed with respect to the trailer. Thus, the maximum freedom allowed by the universal joint provided between ball and socket 22 and 24 is utilized without sacrificing the stabilizing or leveling secured with the stabilizer arms 28 and 30. If one of the stabilizer arms is depressed due to skewing of the towing vehicle, the hydraulic system forces hydraulic fluid through line 78 to the opposite hydraulic piston causing the opposite stabilizer arm to be upraised farther.

An additional advantage of the present invention accrues from the frictional engagement between friction shoes 54 and the stabilizing arms. As will be apparent, when the towing vehicle turns with respect to the trailer, each of the stabilizer arms slides in a friction shoe 54. The friction between pads 64 and stabilizing bars 28 and 30, however, deters or damps undesired swaying of the trailer. Thus, when the towing vehicle and trailer encounter another large vehicle such as a truck on a two-lane highway, the initial gust of air and subsequent partial vacuum between the vehicles will have less tendency to cause swaying or overturning of the trailer. The amount of friction, as well as the amount of leveling between trailer and towing vehicle may be adjusted hydraulically so that an optimum amount of friction is provided. If additional friction is required for a given rear end level of the towing vehicle, longer or shorter friction shoes 54 may be employed.

The preferred hydraulic cylinder and piston means herein illustrated includes a piston or plunger mounted on the trailer tongue, while the cylinder in turn mounts friction shoes for engaging the underside of a pair of stabilizer arms. Although this construction is found to provide an optimum strength of support, and is therefore preferred, it will be obvious, in a broader sense, that the roles of the piston and cylinder may be reversed if so desired, or some other hydraulic cylinder and piston means substituted therefore.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a trailer hitch of the type including a hitch head for mounting on a towing vehicle including a ball for receiving the socket at the forward end of a railer tongue, and including a pair of stabilizer arms rotatably mounted one on each side of said hitch head and adapted for attachment to said trailer tongue, the improvement which comprises: a pair of vertically disposed hydraulic cylinder and piston means supported one on each side of said trailer tongue for upraising respective stabilizer arms relative to said tongue, each of said hydraulic cylinder and piston means supporting a friction shoe pivoted upon a substantially horizontal axis for engaging a respective stabilizer arm, said hydraulic cylinder and piston means each acting vertically to move respective friction shoe in a vertical direction against an arm and being differentially adjustable hydraulically, said hydraulic cylinder and piston means slidably supporting said stabilizer arms when upraised thereagainst so that said stabilizer arms may slide with respect to said hydraulic cylinder and piston means when said towing vehicle executes a curve or corner.

2. In a trailer hitch of the type including a hitch head for mounting on a towing vehicle including a ball for receiving a socket at the forward end of a trailer tongue, and including a pair of stabilizer arms rotatably mounted one on each side of said hitch head, and adapted for attachment to said trailer tongue, the improvement which comprises:
  a pair of hydraulic cylinder and piston means located one on each side of said trailer tongue for upraising said respective stabilizer arms relative to said tongue, said hydraulic cylinder and piston means being hydraulically adjustable in a vertical direction;
  said hydraulic cylinder and piston means permitting slidable movement of said stabilizer arms with respect to said tongue when said hydraulic cylinder and piston means upraise the respective stabilizer arms; and
  said hydraulic cylinder and piston means being hydraulically coupled so that hydraulic fluid flows in common therebetween.

3. A trailer hitch comprising:
  a draw bar for attachment to a towing vehicle;
  a hitch head attached to the rearward end of the said draw bar and including an upwardly projecting ball for receiving a socket mounted on the forward end of a trailer tongue;
  a pair of rearwardly diverging stabilizer arms mounted on said hitch head on either side of said ball for rotation in substantially a horizontal plane with respect to said hitch head;
  and separate vertically disposed hydraulic cylinder and piston means located one on each side of said trailer tongue for upraising said stabilizer arms with respect to said tongue;
  said hydraulic cylinder and piston means slidably supporting said stabilizer arms so that said stabilizer arms slide horizontally with respect to said hydraulic cylinder and piston means as said towing vehicle turns with respect to said trailer; and said piston of each of said hydraulic cylinder and piston means comprising a plunger supported vertically on said trailer tongue, the cylinder of said hydraulic cylinder and piston means being slidably upraised above said plunger and supporting said stabilizer arm.

4. The trailer hitch according to claim 1 wherein said hydraulic cylinder and piston means each support a friction shoe freely pivoted relative to the cylinder and piston means upon a substantially horizontal axis for engaging a respective stabilizer arm and fully engaging such stabilizer arm with up and down movement thereof.

5. The trailer hitch according to claim 4 wherein said friction shoes are each provided with a friction pad secured to said shoe for frictionally engaging a stabilizer arm.

6. A trailer hitch comprising:
a hitch head attached to the rearward end of the said draw bar and including an upwardly projecting ball for receiving a socket mounted on the forward end of a trailer tongue;
a pair of rearwardly diverging stabilizer arms mounted on said hitch head on either side of said ball for rotation in substantially a horizontal plane with respect to said hitch head; and
a pair of vertically disposed hydraulic cylinder and piston means supported one on each side of said trailer tongue for upraising said stabilizer arms with respect to said tongue, said hydraulic cylinder and piston means slidably supporting said stabilizer arms so that said stabilizer arms slide horizontally with respect to said hydraulic cylinder and piston means as said towing vehicle turns with respect to said trailer, said hydraulic cylinder and piston means being hydraulically coupled so that hydraulic fluid flows in common therebetween.

7. The trailer hitch according to claim 6 further including a pump means for delivering hydraulic fluid in common to said hydraulic cylinder and piston means.

8. The trailer hitch according to claim 3 wherein said cylinder includes a vertical slot in the side thereof, and further including means extending through said slot for joining said plunger to said trailer tongue.

9. A trailer hitch comprising:
a draw bar for attachment to a towing vehicle;
a hitch head attached to the rearward end of said draw bar and including an upwardly projecting ball for receiving a socket mounted on the forward end of a trailer tongue;
a pair of rearwardly diverging stabilizer arms mounted on said hitch head on either side of said ball for rotation in substantially a horizontal plane with respect to said hitch head; and separate vertically disposed hydraulic cylinder and piston means supported one on each side of said trailer tongue for upraising said stabilizer arms with respect to said tongue, said hydraulic cylinder and piston means slidably supporting said stabilizer arms so that said stabilizer arms slide horizontally with respect to said hydraulic cylinder and piston means as said towing vehicle turns with respect to said trailer, wherein each said hydraulic cylinder and piston means supports a friction shoe pivoted upon a substantially horizontal axis for engaging a respective stabilizer arm, each said friction shoe engaging a respective stabilizer arm on the underside thereof, said shoe being accessible on top for swingable placement of a stabilizer arm thereover.

UNITED STATES PATENT OFFICE
CERTIFICATE OF CORRECTION

Patent No. 3,542,395  Dated Nov. 24, 1970

Inventor(s) BENSON U. MILLIKAN

It is certified that error appears in the above-identified patent and that said Letters Patent are hereby corrected as shown below:

Front page, item [72], line 2, "Holloday" should be --Holladay--.
    Column 1, line 23, "mount" should be --amount--.
    Column 2, line 65, "slidably" should be --slidable--.
    Column 3, line 37, "alinement" should be --alignment--.
    Column 4, line 22, "railer" should be --trailer--;
            line 32, after "move" insert --a--.
    Column 5, after line 17 (which ends "comprising:"), inse
             a paragraph --a draw bar for attachme
             to a towing vehicle,--.

Signed and sealed this 30th day of March 1971.

(SEAL)
Attest:

EDWARD M. FLETCHER, JR.
Attesting Officer

WILLIAM E. SCHUYLER, JR.
Commissioner of Patents